July 28, 1964   R. P. BROOKS   3,142,133
PLANTER
Filed Jan. 22, 1962   3 Sheets-Sheet 1
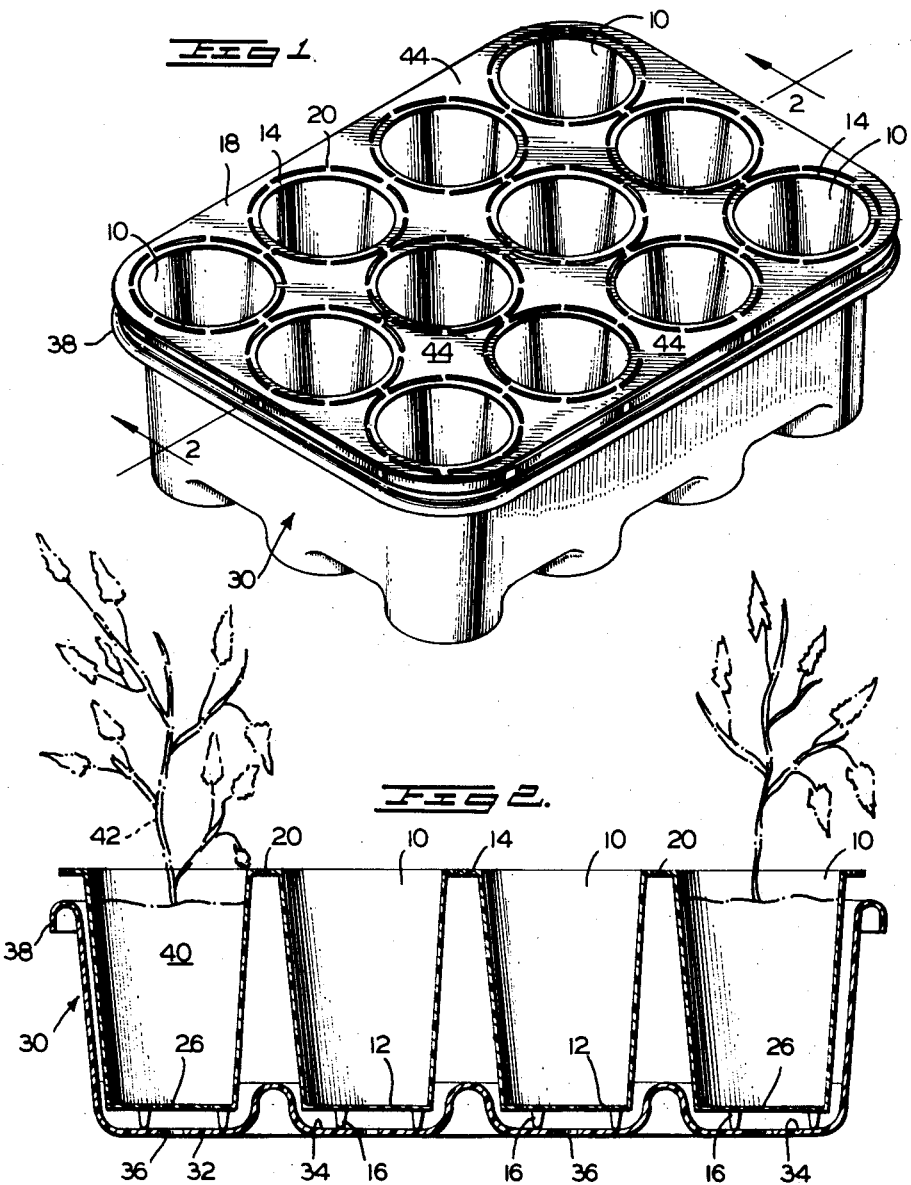
INVENTOR
Ralph P. Brooks
Albert H. Kirchner
BY
ATTORNEY

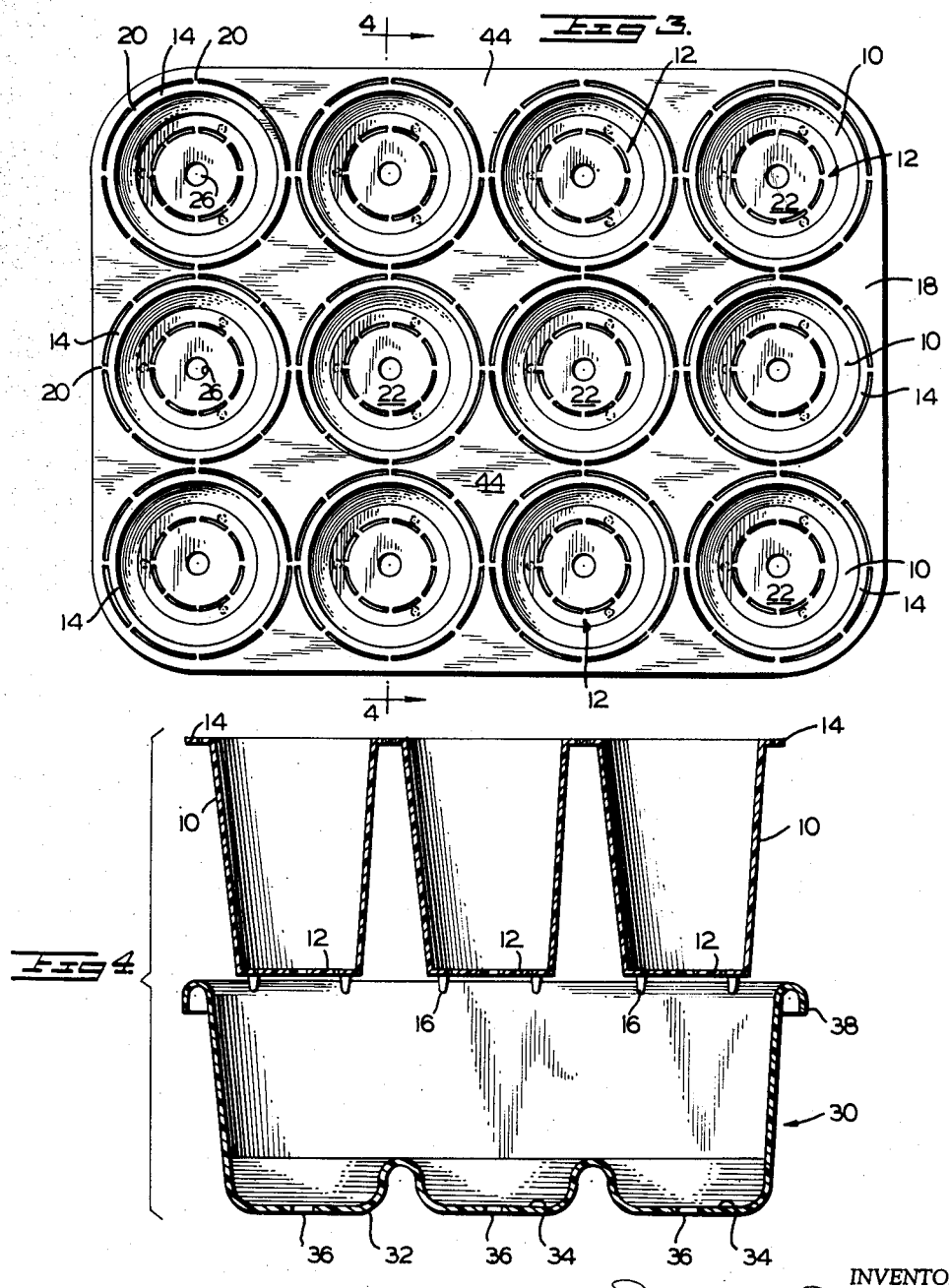

July 28, 1964 R. P. BROOKS 3,142,133
PLANTER
Filed Jan. 22, 1962 3 Sheets-Sheet 3
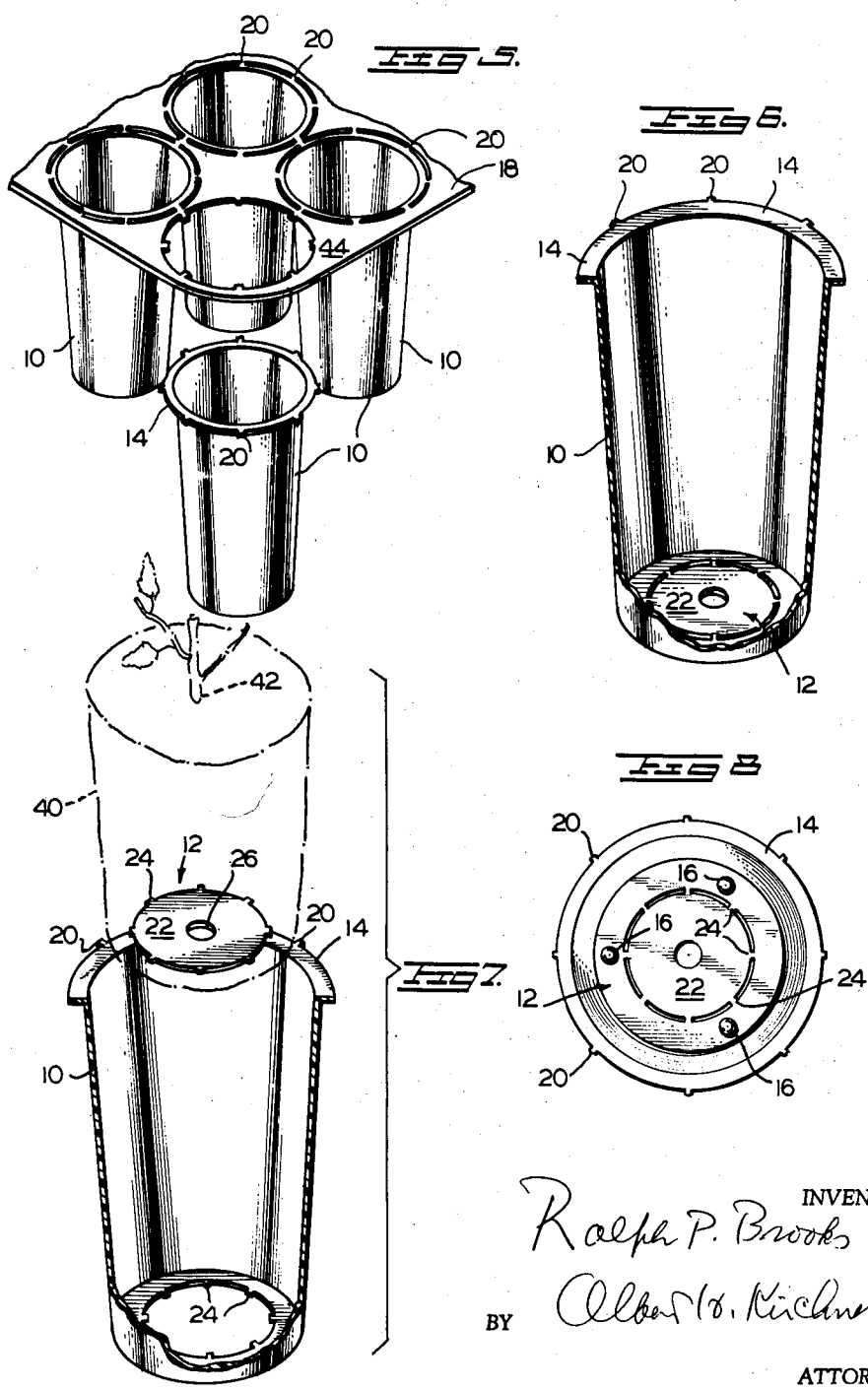
INVENTOR
Ralph P. Brooks
BY Albert H. Kirchner
ATTORNEY United States Patent Office 3,142,133
Patented July 28, 1964

3,142,133
PLANTER
Ralph P. Brooks, 4900 Mountain Crest Drive,
Knoxville, Tenn.
Filed Jan. 22, 1962, Ser. No. 167,634
5 Claims. (Cl. 47—37)

The present invention relates to planters, i.e., to containers for small growing plants, and more particularly to planters intended for commercial use in the retail merchandising of live plants to householders and for such professional uses as the starting of tobacco plants.

An illustrative principal object of the invention is to provide an efficient container for use in the distribution of small house-plants, seedlings, shrubs, and other vegetation specimens from the commercial growers to retail stores which will serve to protect the specimen, hereinafter called the plant, will effectively conserve and hold the soil in which it is planted, and which will be so inexpensive to make that it will add only an absorbable minimum to the cost of the merchandising operation and hence is capable of being put to a single use, followed by destruction by the purchaser, like the paper bags, bottles, cardboard boxes, cans and other packaging universally used in the retail consumer marketing of groceries and the like.

A related object is to provide a container of the character indicated which will comprise a multiple planter, i.e., which will consist of a unitary cluster of individual small receptacles bound together by readily frangible connections so as to be separable into individual pots or into groups of a smaller number of connected pots than the number in the original cluster, thus facilitating the sale and handling of the complete cluster or any part thereof as a single item.

Another object is to expedite the filling of the individual containers or pots with soil and plants by connecting them in multiple assemblies presenting the openings of all the pots of the group co-planar, side by side, with the inter-pot spacing covered by a protective web or sheet of material that will prevent spilling of water and loss of soil.

A further object is to provide individual pots, preferably as units in the assembly or cluster above indicated, whose bottoms are readily separable from the side walls of the pots so that the bottom of each pot can be pushed out from the side walls and up through the pot, thereby forcing upward displacement of the contents as a coherent unit ready to be repotted or set out in a flower box, outdoor bed or the like with a minimum of disturbance to the plant.

These objectives are important in the application of the invention to the propagation of tobacco and other commercial farming operations also.

General objects of the invention are concerned also with improving the retail merchandising of small growing plants such as are now commonly contained in individual clay pots which are relatively expensive or in cardboard cups which are exceedingly fragile, particularly after repeated watering, and which containers in any case, of whatever material made, are hard to handle and stack.

A preferred embodiment of the invention that has been tested in actual commercial operations is shown in the accompanying drawings, in which FIGURE 1 is a perspective view of the complete combination provided by the invention;

FIG. 2 is a vertical cross sectional view taken on the line 2—2 of FIG. 1;

FIG. 3 is a top plan view of the combination shown in FIGS. 1 and 2;

FIG. 4 is a vertical cross sectional view taken on the line 4—4 of FIG. 3 showing the pot cluster or assembly being removed from, or being inserted into, the tray member of the combination;

FIG. 5 is a detail perspective view of a portion of the pot cluster or assembly showing one of the pot elements separated from the pot-connecting web;

FIG. 6 is a perspective view, partly in diametric section, of an individual pot;

FIG. 7 is a view like that of FIG. 6 but showing the bottom of the pot separated from the side walls and being pushed up for removal of the pot contents; and FIG. 8 is a bottom plan view of one of the pots.

In these figures, the reference numeral 10 designates generally an individual, substantially cup-shaped pot of nearly cylindrical, but actually of slightly upwardly flaring frusto-conical, shape like that of the common drinking glass or tumbler. The pot has a flat circular disk 12 as its bottom, and its top rim is formed with a surrounding circumferential flat radial flange 14.

These parts of the pot are preferably all of the same thickness and are all integral, being formed by a single casting operation in a compression molding machine. The material used is preferably a settable plastic, the best practical material which has been used in commercial production being styrene, and particularly reprocessed styrene, which is ground up from trimmings, waste parts, rejects and the like incident to other styrene molding operations and hence is sufficiently inexpensive for the single-use requirement hereinabove stated.

While of course dimensions and proportions form no part of the inventive concept and are in nowise critical, it may be helpful to a good understanding of the article to state that in one successful commercial embodiment the pots are 2½ inches in height, with outside bottom and top diameters of one and seven-sixteenths inch and one and seven-eighths inch respectively, the bottom 12 having a thickness of .044 inch, and the side walls and top rim flange 14 having a thickness of .031 or .032 inch.

Several, not less than three, small feet 16 are cast integrally at equidistant spacing around the outer edge zone of the bottom of the pot, each foot in the commercial embodiment above described being three-sixteenths inch long and tapering from one-eighth inch to a terminal one-sixteenth inch diameter.

A plurality of the pots 10 are molded simultaneously in a single casting. All are cast in a connected cluster, being bound together by a web 18, which may be of the same thickness as the rims of the pots or of slightly less thickness, and which is connected to the rims by narrow links 20. In the illustrative embodiment of the invention each of the rims is connected to the web by eight of these links 20, all equidistantly spaced around the rim. The spaces between the links of each rim constitute arcuate slots. The links are all of the same thickness as the web, and each is one thirty-second inch wide, and the length of each of them, as well as the width of each of the intervening slots, is also one thirty-second inch. The web and the plurality of pots, twelve in the illustrative embodiment as shown in FIGS. 1 and 3, are all molded as a single casting which emerges from the mold as a unitary, integral body. The links, in the small size prescribed, are quite adequate to hold the pots connected to the web during all necessary handling, as when the pots are being filled, when they are full and are being shipped, stacked and manipulated for any purpose, and at all other times, but they are readily broken when desired to separate any pot from the web.

The bottom 12 of each of the pots has a central knockout 22 one inch in diameter connected to the surrounding area of the bottom by eight short and narrow links 24, all exactly like the links 20, and the center of the knockout, in the axis of the pot, has a quarter inch hole 26.

The cluster of pots thus described is nested in a tray designated generally 30 and shown in FIGS. 1, 2 and 4. The tray is best molded of reprocessed styrene like the pot cluster. It is a simple receptacle of general pan shape, having a bottom 32 which is rectangular in plan and is surrounded by four side walls of somewhat less height than the pots and which flare outwardly slightly, at about the same angle as the taper of the pots. The bottom 32 is configured with a plurality of recesses or pockets 34 of the same number as the pots to be contained in the tray, and each recess is sized and proportioned to receive the bottom of one of the pots. The center of each bottom is provided with a hole 36 which may be one-quarter inch in diameter. The thickness of the bottom and the walls of the tray is one thirty-second inch, which provides a structure of adequate strength and rigidity, particularly when the upper edge rim of the side walls is beaded or curled about a one-eighth inch radius as shown at 38.

As shown in FIGS. 1 and 2 the complete assembly of pots and tray is a nested combination of the clustered pots, all joined integrally together by the web 18, seated in the tray, with the feet 16 of each pot standing in one of the recesses 34 and centered about the hole 36 in the center of the recess. This is the assembly that is supplied to the grower. The latter introduces into each of the pots a charge of soil 40 in which a plant 42 is growing, and this comprises the complete product that is distributed to the retailer for display and sale to the ultimate purchaser.

It may be pointed out here that the slightly flaring form of the pots of the cluster permits a plurality of the clusters of empty pots to be nested one within another in shipment from the manufacturer to the grower, and the same flaring form of the trays permits the trays to be similarly nested in compact space-conserving condition for shipment.

It is to be noted that each filled tray, bearing in the illustrative embodiment of the invention a dozen individually potted plants, remains a unitary article of merchandise at least temporarily while on the shelf or counter of the retail dealer. All the plants can be watered at one time by a single sprinkling. Little if any of the water sprinkled onto the cluster will fail to reach the soil in the pots because substantially all the spaces between the pots are covered by the web 18. The holes 26 in the bottoms 12 provide proper drainage for the pots, and any excess of water that issues from these holes into the tray is drained off through the holes 36 in the tray recesses.

It has been found that the attractive appearance of the dozen plants growing in the unitary cluster constitutes a strong psychological incentive to many purchasers to buy the entire assembly. That is to say, a prospective purchaser of some smaller number of the plants is frequently impelled to take the whole trayful. The new arrangement is thus a strong stimulus to sales.

However, it is a simple matter to separate any one or more of the pots from the web 18 that joins it to the others of the cluster. All that is necessary is to break the eight small links 20 that connect the pot to the web, and this is easily done by pushing down on the areas 44 of the web surrounding the particular pot that is to be freed from the web. Alternatively the whole cluster can be lifted from the tray and all or any part of the web can be torn off.

In any event, the pots are ultimately separated from the web, as by the purchaser prior to setting the plants in some intended larger pot, flower box, outdoor bed or the like. This operation of removing the plants from the pots is greatly facilitated, and its successful performance without likelihood of injury or shock to the plants is insured, by the knockouts 22. FIG. 7 illustrates this operation. As there indicated, the knockout is pushed up to separate it from the surrounding zone of the pot bottom 12, by breaking the eight small links 24. The upward push is continued, so as to lift the soil fill and the plant in it bodily up and out of the pot, as shown in FIG. 7.

The pot is then in most cases discarded. However, it can if desired sometimes be put to some further use inverted over the set out plant to protect it from the cold or temporarily from the sun, or it may be embedded upright in the soil around the plant as a protection from cutworms. This latter use is particularly suitable for the protection of very small tomato plants. The low cost of the pot, however, and of the appurtenant web and tray, makes it possible to discard the whole combination after the single use. Indeed, it has been found that the very appreciable reduction of plant loss in distribution from the grower to the retailer and to the ultimate purchaser that is effected by the new planter oftentimes more than makes up for the amount by which the planter cost exceeds that of the cheapest asphalt impregnated paper pots.

Dimensions and proportions have been given hereinabove merely to suggest desirable sizes and relationships of the parts that have been found commercially successful. Of course these values can be altered in any way without departure from the principles of the invention which are pointed out in the appended claims. Moreover, it is by no means essential to the cup-shape of the pots that they be circular in cross section, as in the embodiment herein selected to illustrate the invention. Commercial embodiments have been made of pots of square cross section, with correspondingly shaped square indentations in the bottoms of the pans, and these have been found entirely satisfactory. Other changes in appearance are obviously possible.

I claim:

1. A planter comprising a plurality of individual plant-receiving pots of identical size and truncated conical shape each having at its upper end a radially outwardly directed rim flange of substantially uniform radial extent and all being disposed in upright axially parallel relation with their rim flanges co-planar and with the rim flange of each pot disposed substantially in tangent contact with the rim flanges of adjacent pots at 90 degree spacing, and a web of relatively thin rigid sheet material co-planar with said rim flanges and substantially filling the space between adjacent rim flanges, said web being connected to the rim flanges of the pots at said points of substantially tangent contact by narrow frangible links holding the pots separably together.

2. A planter as claimed in claim 1 in which the web of relatively thin rigid sheet material is further connected to the rim flanges of the pots by narrow frangible links at points midway between the points of substantially tangent contact, whereby each rim flange is separable from the web by breaking eight of said links equally spaced circumferentially around the rim flange.

3. A planter as claimed in claim 1, in combination with a pan-shaped tray having in its bottom a number of spaced indentations equal to the number of pots, each pot being positioned in one of said indentations and having short feet spacing it from the bottom of the pan.

4. A planter as claimed in claim 1, in combination with a pan-shaped tray having in its bottom a number of spaced indentations equal to the number of pots and a drainage hole in each indentation, each pot being positioned in one of said indentations and having short feet spacing it from the bottom of the pan.

5. A planter comprising a pan-shaped tray of generally rectangular shape in plan having in its bottom a number of spaced indentations and a pot cluster comprising a plurality of individual plant-receiving pots of identical size and truncated conical shape, each pot having a bottom comprising a radially inwardly directed rim flange, a central disk connected to the rim flange by a plurality of circumferentially equally spaced narrow frangible links and separated therefrom by an equal number of arcuate grooves intervening between adjacent links whereby the disk may be severed from the flange by breaking the links and then be pushed up through the pot, thereby forcing upward displacement of the contents of the pot, and a plurality of short feet depending from the bottom rim flange and seated in one of said tray bottom indentations and spacing the pot bottom above the floor of the indentation, all of said pots being disposed in upright axially parallel relation and each having at its upper end a radially outwardly directed rim flange of substantially uniform radial extent with all of the upper rim flanges being disposed in co-planar relation and with the upper rim flange of each pot being disposed substantially in tangent contact with the rim flanges of adjacent pots at 90 degree spacing, and a web of relatively thin rigid sheet material coplanar with said rim flanges and substantially filling the space between adjacent rim flanges, said web being connected to the upper rim flanges of the pots at said points of substantially tangent contact by narrow frangible links holding the pots of the cluster separably together.

References Cited in the file of this patent

UNITED STATES PATENTS

| | | |
|---|---|---|
| 1,801,930 | Lietz | Apr. 21, 1931 |
| 2,640,623 | Ryder | June 2, 1953 |
| 3,009,291 | Blackmore | Nov. 21, 1961 |
| 3,035,369 | Helfert | May 22, 1962 |

FOREIGN PATENTS

| | | |
|---|---|---|
| 859,964 | Great Britain | June 4, 1959 |